United States Patent Office 3,146,258
Patented Aug. 25, 1964

3,146,258
PURIFICATION OF ACRYLONITRILE
Harry S. Leach, Texas City, Tex., assignor to Monsanto Company, a corporation of Delaware
No Drawing. Filed Dec. 29, 1961, Ser. No. 163,052
4 Claims. (Cl. 260—465.9)

The present invention relates to the purification of acrylonitrile. More particularly, it relates to a process for treating acrylonitrile containing minor amounts of methyl vinyl ketone for removal of this impurity from the unsaturated nitrile.

Acrylonitrile is a well known article of commerce widely used in the manufacture of various types of synthetic resins and fibers. It is also a valuable intermediate in the synthesis of many organic compounds. In most applications, it is essential that the acrylonitrile be in as pure a state as possible because even minute traces of impurities are often a direct cause of either extremely low yields of the desired products or of inferior qualities in the end product. This is particularly true when acrylonitrile is used in the preparation of synthetic resins and fibers. In most of the processes for producing this nitrile, minor amounts of carbonyl-containing impurities such as methyl vinyl ketone are simultaneously produced. The presence of even very small quantities of such impurities, and particularly methyl vinyl ketone, renders the acrylonitrile unsuitable for many applications. Methyl vinyl ketone copolymerizes with acrylonitrile when the nitrile is polymerized for eventual end-use as a fiber. The resulting copolymer is more susceptible to dyes than is polyacrylonitrile and, consequently, a fiber product made from acrylonitrile containing this ketone is characterized by uneven color distribution when subjected to dyeing.

Accordingly, it is an object of the present invention to provide a process for the purification of acrylonitrile.

It is a more specific object of the invention to provide a process for the removal of minor amounts of methyl vinyl ketone from acrylonitrile.

Additional objects and advantages will become apparent from the description of the process of the invention.

In accordance with the invention, minor amounts of methyl vinyl ketone contained as an impurity in acrylonitrile can be effectively removed therefrom by bringing the contaminated acrylonitrile into intimate contact with a strongly acidic cation exchange resin in its hydrogen form which has been treated with an alkanol containing from 1 to 3 carbons atoms. Contacting is effected either by slurrying the treated resin with the nitrile or percolating the monomer through a column or series of columns packed with the resin. The latter method is the preferred one since it is adaptable to continuous operation and is thus the most practical and efficient method for industrial use.

The invention is illustrated in the following examples which, however, are not to be considered as limiting it in any manner whatsoever.

Example 1

A quantity of a strong acid cation exchange resin consisting of a sulfonated copolymer of styrene and divinylbenzene, a product supplied commercially by The Rohm and Haas Company under the trade name of "Amberlite IR 122X10," was converted to its hydrogen form. This was effected by successive regeneration and rinses using 10% sulfuric acid and strong caustic with the final step in the cycle being an acid wash. The resin was then washed with demineralized water until all traces of acid were removed. Thereafter, it was washed thoroughly with methanol to remove all traces of water and dried by evaporation of the excess methanol under reduced pressure (20–50 mm.) at room temperature.

The treated resin was charged to an adsorption column about 24 in. long and 18–20 mm. in outside diameter to a depth of about 14 in. Acrylonitrile containing about 1030 parts of methyl vinyl ketone per million parts of acrylonitrile was passed through the resin bed at a rate of about 1.0 to 1.5 ml. per minute with the flow being controlled by means of a stopcock at the bottom of the column. Samples of the column effluent were collected periodically and analyzed for methyl vinyl ketone content by the same polarographic technique employed to determine the initial methyl vinyl ketone content of the acrylonitrile being treated. The data obtained are tabulated below.

| Sample No. | Volume Sample (ml.) | Methyl Vinyl Ketone Content (p.p.m.) |
|---|---|---|
| 1 | 95 | 0 |
| 2 | 100 | 65 |
| 3 | 100 | 135 |
| 4 | 420 | 460 |

Example 2

The resin from Example 1 was regenerated after several additional runs similar to that described in that example by washing with 10% $H_2SO_4$, demineralized water and methanol in the manner previously described in Example 1. A 200-ml. sample of acrylonitrile containing 1030 p.p.m. of methyl vinyl ketone was passed through a column packed with the regenerated resin at a rate of approximately one ml. per minute. A spot sample of about 5 ml. was taken of the column effluent after about 100 ml. of the acrylonitrile had passed through the column. Upon analysis, this acrylonitrile was found to contain only about 3 p.p.m. of methyl vinyl ketone. Analysis of a spot sample of the final column effluent showed it to contain about 41 p.p.m. of methyl vinyl ketone.

Example 3

The resin used in Examples 1 and 2 was again regenerated by washing with acid, demineralized water and methanol as described in Example 1. Acrylonitrile containing 612 p.p.m. of methyl vinyl ketone was passed through a column packed with the regenerated resin at a rate of about one ml. per minute. Samples of the column effluent were collected periodically and analyzed for methyl vinyl ketone content. Results obtained are tabulated below.

| Sample No. | Volume Sample (ml.) | Methyl Vinyl Ketone Content (p.p.m.) |
|---|---|---|
| 1 | 100 | |
| 2 | 100 | 18 |
| 3 | 85 | 28 |
| 4 | 100 | 24 |
| 5 | 100 | 16 |
| 6 | 50 | 35 |
| 7 | 115 | 212 |
| 8 | 115 | 447 |
| 9 | 125 | 505 |
| 10 | 110 | 550 |

Example 4

A fresh quantity of the resin used in Example 1 (Amberlite IR 122X10) was converted to its hydrogen form by two successive regenerations and rinses with a 10% solution of sulfuric acid and demineralized water. Thereafter, samples of the resin were dried in an oven for periods of time ranging from 3.5 to about 17 hours at temperatures from 120 to 130° C. The dried resins were then employed as in Examples 1 to 3 in separate adsorption columns for treating samples of acrylonitrile containing known amounts of methyl vinyl ketone. Rates of through-put were substantially the same as those in the foregoing examples. Analyses of samples of the acrylonitrile effluents from the columns for methyl vinyl ketone established that little if any reduction in content of this ketone impurity was obtained.

The foregoing data provide a convincing demonstration that methyl vinyl ketone present as an impurity in small amounts in acrylonitrile is effectively removed by adsorption on a strong acid cation exchange resin in the hydrogen form which has been treated with an alkanol. Without this treatment, the resin is ineffective as is evident from Example 4.

The purification process of the invention is not to be considered as limited to the precise materials, conditions or mode of operation set out in the examples. For example, any strongly acidic cation exchange resin can be employed. In addition to the sulfonated copolymer of the examples, there may be used other sulfonated aromatic hydrocarbon polymers and copolymers, phenol-aldehyde condensation products containing sulfonic acid groups, and sulfonated carbonaceous materials such as coal, peat, lignite, and the like.

The alkanol treatment required for the cation exchange resin is a simple one. After the resin has been converted to the hydrogen form and thoroughly rinsed with demineralized water, it is then washed thoroughly with a monohydric alkanol containing from 1 to 3 carbon atoms. While methanol is the preferred alkanol, ethanol, propanol and isopropanol are all effective treating agents for the resin. Excess alkanol is removed by evaporation to the point at which the resin assumes the appearance of dryness. The drying operation is preferably effected at ambient temperature but temperatures up to 50° C. can be employed if desired. Suitable pressures for evaporating the excess alkanol are those in the range from about 20 to about 100 mm. absolute.

The temperature at which the ion exchange treatment of acrylonitrile is carried out is most conveniently the ambient temperature of the area. However, there appears to be no reason why temperatures lower than the ambient cannot be used, provided that they are kept within the range at which the acrylonitrile flows readily enough for easy handling. Likewise, temperatures above the ambient can be employed so long as they are kept well below that at which acrylonitrile begins to polymerize.

The process may be operated either on a batch or a continuous basis. A continuous process employing standard adsorption columns in series is by far the preferred mode of operation from a commercial standpoint. When this percolation method is used, the acrylonitrile to be purified may be allowed to flow down through the column by gravity or a slight pressure may be applied by means of an inert gas such as nitrogen. Alternatively, if desired, the acrylonitrile being treated may be forced through the cation exchange resin from below.

The time of contact depends upon the amount of methyl vinyl ketone present, the particular cation exchange resin employed, the particle size of the resin, and the efficiency of removal desired. The period during which the acrylonitrile is in contact with the strongly acidic cation exchange resin is controlled in the percolation method, for example, by adjustment of the length of the column. In practical operation, a series of columns may be employed, the outflow from one column, if it is not completely purified of methyl vinyl ketone, being cycled through the next until the effluent acrylonitrile is completely freed of this ketone impurity.

It is important in the operation of the process of the invention that the acrylonitrile to be treated be substantially free of water. Efficient removal of methyl vinyl ketone cannot be effected if the acrylonitrile contains water in amounts above about 0.5%.

Regeneration of the cation exchange resin is readily accomplished by known techniques, i.e., by washing the resin with either sulfuric acid or hydrochloric acid followed by rinsing to remove all traces of the acid with demineralized water. When these acids are used, the regenerant concentration is not critical. Usually concentrations of sulfuric acid in the range from about 4% to about 15% are employed with those around 9% to 10% preferred. For all practical purposes, a concentration of 10% is generally employed for the hydrochloric acid used as a regenerant.

What is claimed is:

1. A process for the removal of minor amounts of methyl vinyl ketone from acrylonitrile which comprises intimately contacting said acrylonitrile with a strongly acidic cation exchange resin which in its hydrogen form has been washed with a monohydric alkanol having from 1 to 3 carbon atoms and dried to remove excess alkanol therefrom and recovering said acrylonitrile.

2. A process for the removal of minor amounts of methyl vinyl ketone from acrylonitrile which comprises passing said acrylonitrile through and in contact with a series of beds of a strongly acidic cation exchange resin in its hydrogen form which has been washed with a monohydric alkanol having from 1 to 3 carbon atoms and dried to remove excess alkanol therefrom and recovering the effluent acrylonitrile.

3. The process of claim 2 wherein said resin is a sulfonated copolymer of styrene and divinylbenzene.

4. The process of claim 3 wherein said alkanol is methanol.

References Cited in the file of this patent

UNITED STATES PATENTS

| | | |
|---|---|---|
| 2,555,798 | Kropa | June 5, 1951 |
| 2,622,097 | Osborne | Dec. 16, 1952 |
| 2,770,644 | Owens | Nov. 13, 1956 |
| 2,987,451 | Sennewald et al. | June 6, 1961 |